United States Patent [19]

Houston

[11] Patent Number: 4,475,043

[45] Date of Patent: Oct. 2, 1984

[54] XENON X-RAY DETECTOR WITH TAPERED PLATES

[75] Inventor: John M. Houston, Schenectady, N.Y.

[73] Assignee: General Electric Company, Schenectady, N.Y.

[21] Appl. No.: 42,629

[22] Filed: May 25, 1979

[51] Int. Cl.[3] .................. G01T 1/18

[52] U.S. Cl. .................. 250/385; 313/93

[58] Field of Search .................. 250/385, 374; 313/93; 378/19

[56] References Cited

U.S. PATENT DOCUMENTS

| | | | |
|---|---|---|---|
| 2,917,647 | 12/1959 | Fowler et al. | 250/374 |
| 3,991,312 | 11/1976 | Whetten et al. | 250/385 |
| 4,031,396 | 6/1977 | Whetten et al. | 250/385 |

*Primary Examiner*—Alfred E. Smith
*Assistant Examiner*—Carolyn E. Fields
*Attorney, Agent, or Firm*—Lawrence D. Cutter; James C. Davis, Jr.; Marvin Snyder

[57] ABSTRACT

The leading edge of the plates employed in a high pressure gaseous xenon x-ray detector are tapered so as to be narrower along the edge of the plates nearest to the x-ray source. Xenon x-ray detectors produced in accordance with the present invention exhibit an increased quantum detection efficiency without a significant increase in noise due to microphonics.

4 Claims, 2 Drawing Figures

XENON X-RAY DETECTOR WITH TAPERED PLATES

BACKGROUND OF THE INVENTION

This invention relates to x-ray detectors comprising electrically conductive plates disposed in an ionizable medium such as xenon gas, and more particularly, it relates to plate shapes which increase the quantum detection efficiency.

Ionization chambers are commonly used for detecting x-ray photons and other ionizing radiation. X-ray photons interact with atoms of a heavy detector gas to produce electron-ion pairs. X-ray photons are, generally, absorbed by a gas atom which emits a photoelectron from one of its electronic levels. The photoelectrons move through the gas, interacting with other ionizing gas atoms, to produce a shower of electrons and positive ions which are collected on suitable electrodes to produce an electric current flow. If such electron ion pairs are produced in a region between two electrodes of opposite polarity, they drift along electric field lines to the electrodes and yield an electric current. The electric current that flows between the electrodes is a function of the total number of x-ray photons interacting in the vicinity of the electrodes. In this way, the magnitude of the resulting electric current is a direct measure of the intensity of an x-ray beam impingent between the electrodes.

X-ray detectors of the present kind typically comprise spaced apart electrically conductive plates typically comprising a high Z (i.e., high atomic number), electrically conductive material such as tungsten. These plates are typically disposed in a pressurizable housing having means therein for the application of electrical potentials to the plates. The housing typically comprises, at least in part, a low Z material, such as aluminum, so that it is relatively transmissive to the impinging x-ray beam. Within the housing the parallel conductive plates are immersed in a high pressure gaseous ionizable medium such as xenon. While other gases may be employed as the ionizable medium, xenon is preferred because of its relatively high atomic number, its ionizability in the presence of x-rays, its inertness, and its fluid nature even at relatively high pressures such as 25 atmospheres, which pressure is typical of those employed to increase the absorption of x-rays. Such x-ray detectors are described, for example in U.S. Pat. No. 4,047,040 and in U.S. Pat. No. 4,047,041, both issued Sept. 6, 1977 to the inventor herein and assigned to the same assignee as the present invention. Both of these patents are incorporated herein by reference. These x-ray detectors are particularly useful in computerized tomographic applications involving the imaging of internal body organs of patients exhibiting a variety of symptoms and conditions. Accordingly, to reduce the x-ray level to which patients are exposed, it is desirable that the x-ray detector operate in an efficient manner. Additionally, in order for the radiologist and/or physician to render an appropriately accurate diagnosis, it is highly desirable that the resolution of the resulting tomographic image be as high as possible and in the case of the ionization detectors described herein, the increased resolution is obtained through a closer spacing of the detector plates.

However, a simple shrinking of the distance between the detectors plates produces certain undesirable results. In particular, the plates have a finite thickness which may be as small as approximately 6 mils. As the distance between detector plates is decreased, a larger and larger fraction of the volume into which the x-ray beam is directed is taken up by the detector plates which absorb the x-ray beam energy without producing any detectible current. Thus, as the detector resolution is increased, the thickness of the plates must also be decreased so as to provide a maximum volume of xenon gas for the production of photoelectrons. However, as the thickness of the plates is decreased, there is an increased tendency for the production of microphonic noise which can degrade the resultant image quality. This microphonic noise arises as the result of the various room and machine vibrations being transmitted to the detector plates which, if they are decreased in thickness, have a lower stiffness and mass and correspondingly increased vibration amplitudes.

In spite of these potential problems with microphonic noise, there are several significant advantages arising from x-ray detectors of the present kind, not the least of which is their high degree of efficiency requiring low patient x-ray exposures. Additionally, the gaseous ionization medium fills the geometry of the parallel plate configuration. This is to be contrasted with the use of solid crystalline bodies as x-ray detectors since such crystals must be precisely machined to fill the space between tungsten plates which are still necessary in such detectors to prevent cross talk between adjacent detector cells. Additionally, the xenon as employed in a housing as described above completely fills the spaces between the plates in a uniform manner. This uniformity insures a minimal tracking error, that is, the error that results when the responses of adjacent cells are not consistent in the level of current produced for a given x-ray intensity level. Additionally, ionization detectors of the kind described herein are significantly less expensive to manufacture than those detectors which employ relatively large bodies of scintillation crystal material.

SUMMARY OF THE INVENTION

In accordance with a preferred embodiment of the present invention, in a high pressure ionization detector including a housing, a gaseous ionizable medium disposed within the housing and parallel, high Z, electrically conductive plates oriented in a direction substantially orthogonal to a face of the housing which is relatively transmissive to x-rays, the front edges of the plates are tapered so as to be narrower at the tips of the edges which are nearest to the impinging x-ray beam. The tapering of the plates is provided either by machine grinding or by electrolytic etching. Because of the absorption of x-rays and the production of photoelectrons in the detector gas is an exponentially decreasing function of gas penetration, the tapering of the leading edges of the plates provides a greater volume of detector gas where it is most useful in terms of detector efficiency. Moreover, there is a minimal reduction in mass with the tapered detector plates and the problem of microphonics is much less than if the thickness of the whole detector plate were to be reduced.

Accordingly, it is an object of the present invention to increase the quantum detection efficiency of a high pressure ionization chamber detector without significantly increasing microphonic noise effects by tapering the leading edge of the detector plates.

DETAILED DESCRIPTION OF THE INVENTION

Figure 1:
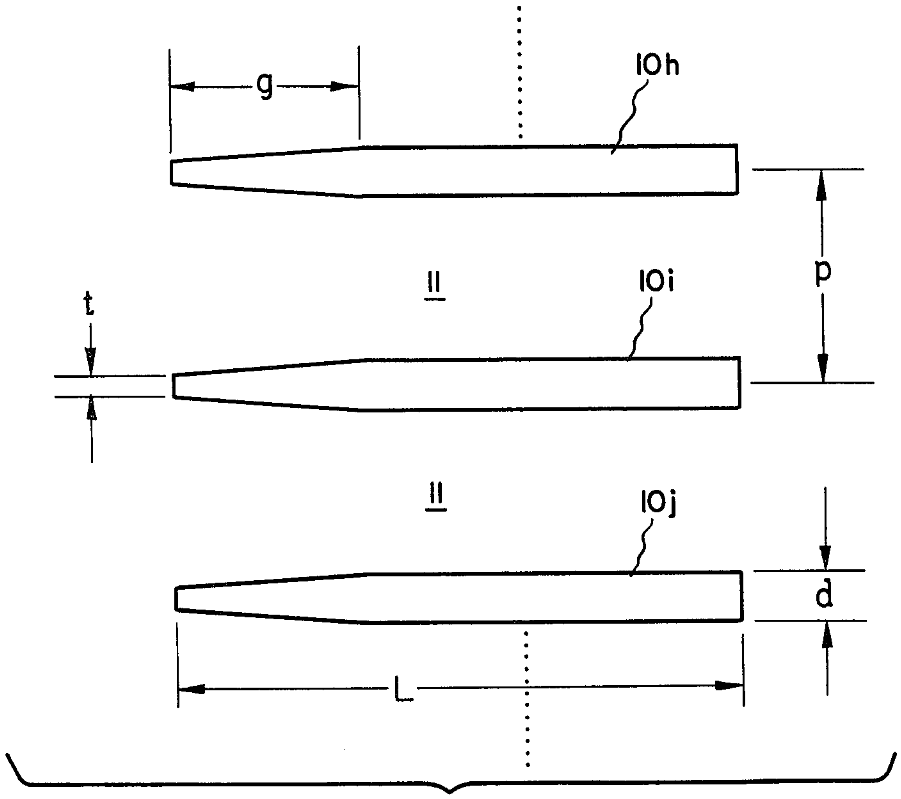
FIG. 1 is a top view of the detector plates manufactured in accordance with the present invention and further illustrating their dimensional relationships.

FIG. 1 illustrates a preferred embodiment of the present invention in which there are shown detector plates 10*h*, 10*i*, and 10*j* arranged in a spaced apart relationship, the center-to-center distance between adjacent plates being given by the length p as shown. The detector plates shown are but three plates in an x-ray detector which typically includes several hundred or a thousand plates defining a plurality of cells, each filled with an ionizable medium 11 such as xenon gas. Each detector plate has a thickness d and a length from front to back of L. The front edge of the detector plates, that is, the plate edge most proximal to the x-ray source is tapered for a distance g. The thickness of the detector plates at their leading edge is t as shown, and this thickness gradually increases to the thickness d as shown at a distance g from the front edge. The distance g is typically approximately one-third of L. As described in the above-mentioned U.S. patents, the detector plates are disposed in an appropriate pressurizable housing having a front face thereof which is transmissive to x-ray energy. For this purpose, the front face, or the entire housing, may comprise a material such as aluminum which has a low atomic number and absorbs relatively little x-ray energy. The tapered edges of the detector plates of the present invention are disposed in the housing with the tapered edges adjacent to the front face of the housing. The housing, of course, is provided with means for applying differing electric potentials to alternate sets of detector plates. The detector plates preferably comprise electrically conductive high Z material, such as tungsten, but may also comprise material such as tantalum or rhenium.

FIG. 1 illustrates the fact that the tapering of the leading edges of the detector plates increases the volume of xenon gas available for the detection of x-rays. The tapering of the leading edges provides a larger benefit than the increase in the gaseous volume shown because of the nature of the x-ray absorption which, in fact, occurs primarily in the volume of gas in the region of tapering because the characteristic x-ray absorption in the medium falls off as $e^{-\alpha x}$, where x is the distance of x-ray penetration into the medium, and where $\alpha$ is a constant which depends on the x-ray energy and the pressure of the medium. The quantity $\alpha$ is typically 1 $cm^{-1}$ for the situation in which the x-ray photons possess energy of approximately 70 kev and in which there is xenon gas pressure of approximately 25 atmospheres. Because of the nature of the x-ray absorption, the quantum detection efficiency increases in a fashion greater than computation just based on volume increase would indicate. In particular, if we define quantity R to be the ratio of the quantum detection efficiency with the tapering as shown in FIG. 1 to the quantum detection efficiency without tapering, that is, with a plate having purely rectangular dimensions of L×d, then R may be calculated from the following equation $$R = 1 + \frac{d-t}{p-d} \cdot \frac{[1 - (1 - e^{-\alpha g})/\alpha g]}{(1 - e^{-\alpha L})}$$

By way of example, and not limitation, typical dimensions may be presented which illustrate the benefits achieved by the present invention. For example, typical dimensions for the quantities shown in FIG. 1 are: d=6 mil, t=1 mil, g=394 mil, L=1,000 mil, and p=24 mil. It is also assumed that the value of $\alpha$ of 1/cm as given above also applies. It is easily calculated that in this example, tapering of the plates results in 5.5 percent increase in xenon volume between the plates. However, if the expression given above for R is calculated using the indicated values, then it is seen that the tapering of the plates results in an increase in quantum detection efficiency of 11.1 percent. This is very close to the gain in quantum detection efficiency that would result if 4 mil thick tungsten plates were employed instead of the tapered 6 mil plates. However, the microphonic characteristics of the tapered plates are much better than the microphonic characteristics associated with the 4 mil thick plates.

Figure 2:
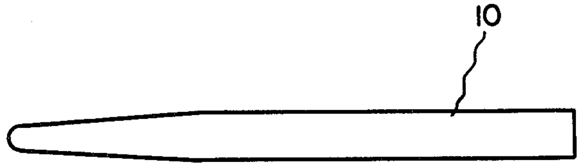
FIG. 2 is a top view of a detector plate of the present invention produced by electrolytic etching and exhibiting a rounded edge.

There are two ways in which the tapering of the plates may be conveniently accomplished. First, the plates may be ground to a tapered configuration by machine, resulting in a taper shape such as that shown in FIG. 1. Second, the taper could be produced through electrolytic etching. For example, the etching may be accomplished by dipping the plates into a strong basic solution such as sodium hydroxide while applying an alternating voltage between the plates and a nickel or carbon electrode immersed in the basic solution. The electrolytic etching method for tapering the leading edge is somewhat preferred since the resulting edge is somewhat rounded as is shown in FIG. 2. This rounded taper geometry is preferred because the smoother corners result in a somewhat reduced electric field near the tips of the plates.

From the above, it may be appreciated that the quantum detection efficiency of a high pressure gaseous x-ray detector is appreciably increased by tapering the thickness of the front edge of the plates. Tapering approximately the front one-third of the detector plate in this way increases the quantum detector efficiency without significantly increasing the effects of microphonic noise. Moreover, the detector plates of the present invention may be tapered easily and inexpensively by electrolytic etching methods.

While this invention has been described with reference to particular embodiments and examples, other modifications and variations will occur to those skilled in the art in view of the above teachings. Accordingly, it should be understood that within the scope of the appended claims, the invention may be practiced otherwise than is specifically described.

The invention claimed is:

1. An x-ray detector including a pressurizable housing, said housing having at least a front face thereof comprising x-ray transmissive material, said housing containing an ionizable medium, said housing also containing therein a set of parallel plates comprising high Z, electrically-conductive material, said plates being oriented substantially orthogonally to said front face and being spaced apart from one another, alternating ones of said plates being electrically isolated so as to be connectable to distinct levels of electric potential, the edges of said plates proximal to said front face being tapered so as to be narrower near said front face.

2. The x-ray detector of claim 1 in which the tips of said tapered edges are rounded.

3. The x-ray detector of claim 1 in which said ionizable medium comprises xenon.

4. The x-ray detector of claim 1 in which said electrically-conductive plates comprise tungsten.

* * * * *